United States Patent [19]

Anton

[11] 3,935,456

[45] Jan. 27, 1976

[54] PULSED SOURCE HIGH-SPEED DRY PROCESS PHOTOGRAPHIC PRINTER PROCESSOR

[75] Inventor: Nicholas G. Anton, Brooklyn, N.Y.

[73] Assignee: The Eon Corporation, New York, N.Y.

[22] Filed: June 13, 1972

[21] Appl. No.: 262,294

Related U.S. Application Data

[63] Continuation of Ser. No. 115,813, Feb. 16, 1971, abandoned.

[52] U.S. Cl. .............................. 250/316; 250/504
[51] Int. Cl. .......................................... G03g 17/00
[58] Field of Search .......... 250/316, 317, 318, 319, 250/492, 504

[56] References Cited

UNITED STATES PATENTS

| 3,157,102 | 11/1964 | Pfaff | 95/75 |
| 3,230,857 | 1/1966 | Ritzerfeld | 95/75 |
| 3,441,347 | 4/1969 | Lassig | 355/104 |

Primary Examiner—James W. Lawrence
Assistant Examiner—C. E. Church
Attorney, Agent, or Firm—Darby & Darby

[57] ABSTRACT

A processor for developing films and more particularly films of the diazo type in which the film and material to be copied are wrapped around a transparent drum and the film is developed by a light of the proper wavelength whose energization is periodically controlled.

8 Claims, 2 Drawing Figures

PULSED SOURCE HIGH-SPEED DRY PROCESS PHOTOGRAPHIC PRINTER PROCESSOR

This is a continuation of application Ser. No. 115,813, filed Feb. 16, 1971, now abandoned.

There presently exists a class of film of the so-called diazo type which comprises a sheet of a thermoplastic vehicle containing record forming cavities, or bubbles, and essentially invisible decomposition products of a sensitizing substance capable of generating gas sources upon exposure to radiation. The vehicle is usually water-inert and has great diffusivity and permeability properties which at a given exposure temperature below a given developing temperature and below the disintegrating temperature of the sensitizing substance promote formation of the cavities. Such types of films, for example, are manufactured by Kalvar Manufacturing Company of New Orleans, Louisiana, and are disclosed, for example, in U.S. Pat. No. 2,911,299 issued Nov. 3, 1959 to A. Biril, Jr. et al. and entitled "System of Photographic Reproduction" and U.S. Pat. No. 3,032,414 issued May 1, 1962 to R. W. James et al. and entitled "System of Photographic Reproduction."

The present invention relates to a machine for developing film of the foregoing type in a rapid and efficient manner. More particularly, the film to be developed is located adjacent a photographic material which is to be copied on said film and wrapped around a rotating transparent drum. A light source of the proper wavelength and sufficient energy potential is located within said drum and operated periodically to expose the film. After exposure, the film is passed through a heat roller for developing and fixing and the developed film and the photographic record material copied are separated and wound upon separate drums.

Other objects and advantages of the present invention will become more apparent upon reference to the following specification and annexed drawings in which.

Figure 1:
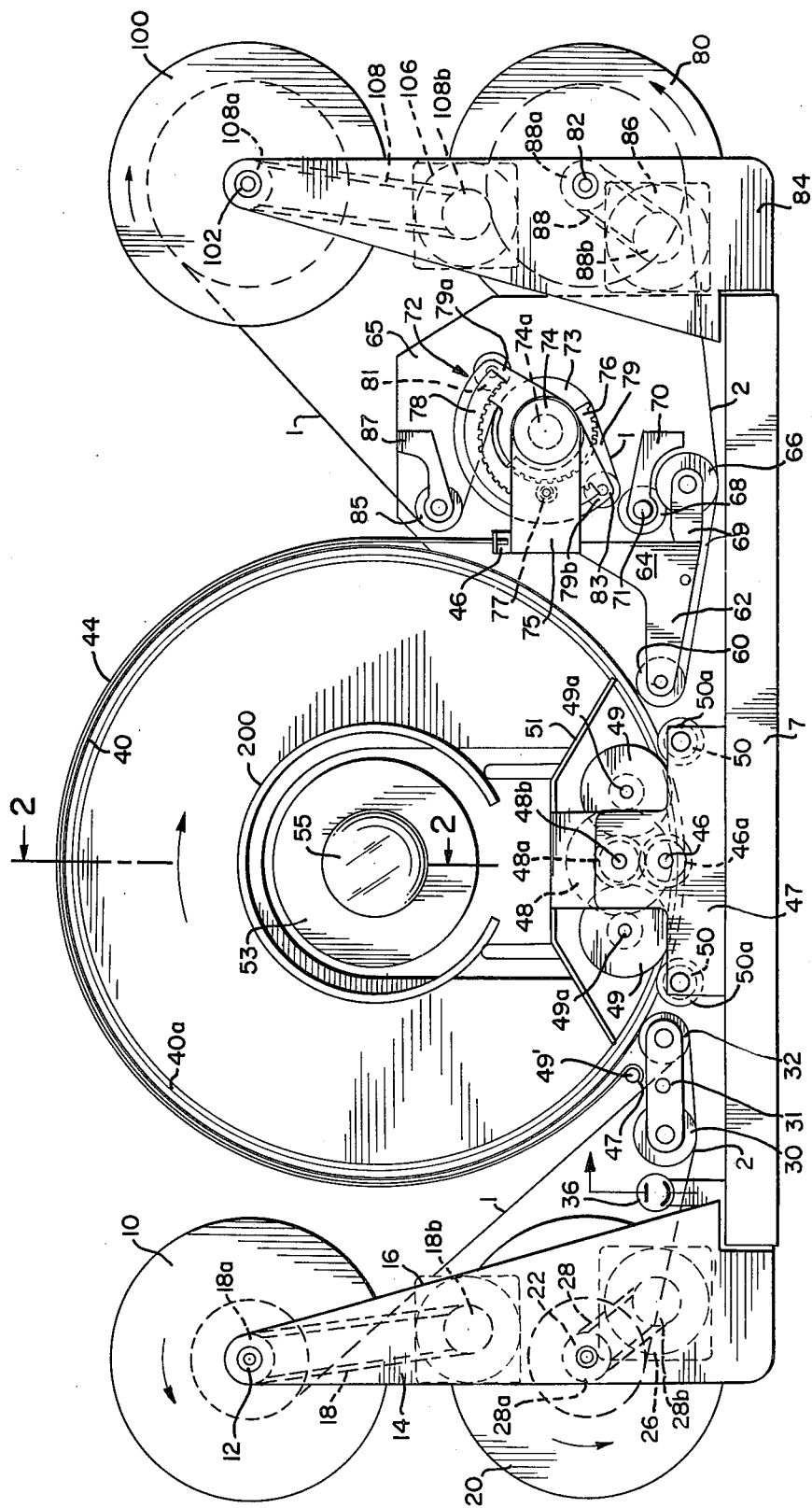
FIG. 1 is a side elevational view of a preferred embodiment of the machine.
Figure 2:
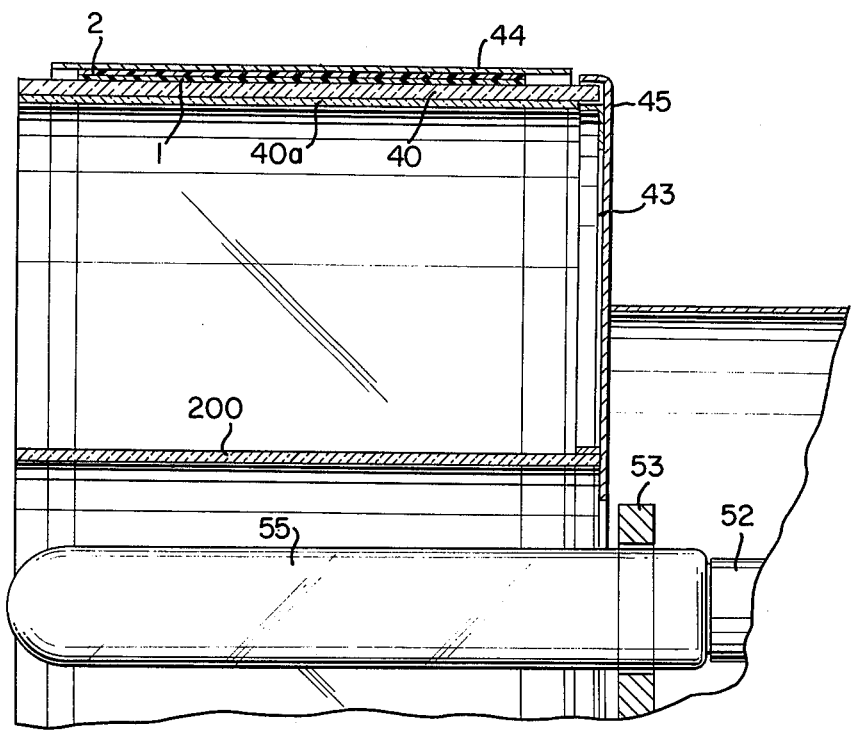
FIG. 2 is an elevational view in section showing a portion of the drum.

Referring to FIGS. 1 and 2 the dizao type film 1 to be developed and fixed is wound on a spool 10 mounted by suitable shaft and bearing assembly 12 on the upper portion of a pair of brackets 14. The spool 10 is driven by a motor 16 mounted on one of the brackets 14 through a drive belt 18 and pulleys 18a and 18b on the spool 10 and motor 16. The film record 2 to be copied which can be for example a photographic film is wound on a record spool 20 mounted on a shaft and bearing assembly 22 located on the bottom portion of the brackets 14. The film record spool 20 is driven by a motor 26 through a belt drive 28 and the pulleys 28a and 28b on the spool 20 and motor 26.

The film record web 2 passes under a first idler roller 30 mounted on a bracket 31. The bracket 31 is held to a fixed base 7 by any suitable means and may be spring biased if desired. The details of the roller bracket mounting are not shown, for the sake of clarity. Roller 30 is made of rubber or other suitable material. The film 1 to be developed passes beneath a second idler roller 32 of the roller assembly 31 and it is located beneath the film record 2 at the bottom of roller 32. Consequently, on the output or upper side of the idler roller 32 the two films are sandwiched together with the film 1 to be developed being on the outside.

The sandwich of the film 1 and film record 2 curve upwardly to lie on the face of a transparent, circular drum 40. The cylindrical face of drum 40 may be made of PYREX, LUCITE, or any other suitable type of material with good light transmitting characteristics for the particular wavelength of energy to be used. The film 1 to be developed is spaced from the outer surface of the drum 40 by the film record 2. This sandwich of film 1 and film record 2 is held around the periphery of the drum 40 by a shroud 44, preferably of opaque material, such as a dark canvas. The shroud 44 is fixed at one end to a stationary mounting bar 46 located on a mounting arm 75 which is attached to a rear mounting plate 65 which is in turn connected to base 7. The other end of the shroud has a hook 47 or other suitable fastening device for fastening to a mounting rod 49' for holding the shroud tight when it is positioned around the drum 40. The mounting rod 49', as is the roller holder 31, is attached to a vertical mounting plate (not shown) which is mounted to the base 7.

Since the sandwich of film and film records 1 and 2 will be moving around the periphery of the drum 40, the drum is also made rotatable preferably by mounting it at its center on end wall 43 on rotatable bearings (not shown). A flanged ring 45 holds the transparent cylinder portion of the drum to the end wall 43.

A motor (not shown) mounted in front of the open side of the drum 40 on a T-shaped mount 47 has an output shaft 46 on which is mounted a drive tire 46a. The drive tire 46a engages a drive tire 48a mounted on a rotatable shaft 48b on which a second drive tire 48 is mounted. Shaft 48b is held by suitable bearing on the mounting plate 47. The drive tire 48 engages a pair of shafts 49a on which are mounted drive tires 49. The shafts 49a can be held in bearings connected to an extension of the mounting plate 47. The rotatable drive tires 49 engage the inner surface of the drum cylindrical wall to rotate the drum to provide a small amount of motion to the drum to overcome any inertia forces. The drum rests on a pair of idler rollers 50 having flanges 50a located on each side of the drum (only one flange being shown). The flanges 50 engage the drum edges to provide lateral stability so that it does not rock or decay about its axis.

All of the components for rotating the drum 40 are of suitable material such as rubber, TEFLON and/or nylon for the various drive tires, etc. These components are mounted beneath a heat shield 51 within the drum.

An elongated light source 55 is mounted within a socket 52, located outside of the drum. The socket 52 has connections (not shown) to the lamp power supply (FIG. 2). The lamp 55 is stabilized by a collar 53.

The lamp 55 is an elongated lamp producing ultraviolet energy, or energy of any other wavelength, suitable for exposing the diazo film 1, which spans the width of the drum 40 over which the film 1 and film record 2 are to pass. It is operated on a pulsed basis by a suitable power supply (not shown) to provide a pulse of light of a duration sufficient to "stop" the motion of the film and film record as they move continuously around the drum 40. This in effect makes the printing aperture extremely narrow. This eliminates any registration problem, or problems of movement between the film and film record. This gives good resolution on the film 1 of the information to be copied from the film record 2.

The film, when exposed, should not exceed a predetermined temperature, which is in the order of 120°F.

Since the infrared energy radiated by the flash lamp 55 may raise the film to this temperature, a heat shield or filter 200 is interposed between the lamp 55 and the printing cylinder 40. The head shield 200 has a fully cylindrical, or partially cylindrical, shape to correspond to the area of the printing drum to be exposed. It is preferred that the heat shield transmit the ultra-violet energy while reflecting the infrared energy. Thus, it may be of the dichroic type. A suitable heat shield is available from Corning Glass Company of Corning, New York which passes about 86 percent of the radiated energy from 3600 to 4000A and absorbs or reflects the energy from 8500A to 10 m$\mu$.

A mirror type coating 44a of the dichroic glass is also preferably formed on the inside of the drums 44. This coating is of the same type referred to above, that is, it passes ultra-violet energy while reflecting or absorbing infrared energy. The combination of the heat shield and the coating 44a ensure that very little, if any, of the infrared energy reaches the film. This keeps the temperature of the film below that which might be harmful.

The power supply (not shown) for the lamp 55 can be of any suitable type. For example, it can be a thyratron or SCR operated supply or of the capacitor storage type. Also, if it is desired to reduce the dwell time between flashes of the lamp 55, several power supplies can be used and their operation multiplexed. Similarly, it is also possible to mount several lamps within the drum 40 and to flash the lamps simultaneously or sequentially. In any case, the flashing of the lamp or lamps is done to "stop" the motion of the film and film record.

A photocell sensor 36 is shown mounted adjacent the drum 40. The sensor is used to sense the spacing between the frames of the film record 2 to be copied or other marks on the film record. The light source for the photocell 36 is not shown, for the sake of simplicity. The sensor 36 triggers the lamp source to cause the lamp to flash each time a frame mark passes. The wiring between the sensor 36 and the power supply itself are conventional and are not shown.

The interior of the drum 40 is preferably cooled by forced convection provided by fans (not shown). To accomplish this, the rear wall of the drum can be cut out or a spoke arrangement can be used. Further, a transparent infrared coating can be used on the interior of the drum to reduce the heat on the cylindrical wall. Fans or other cooling means can be used on other parts of the machine, as desired.

After passing over the transparent drum 40 where the film 1 is exposed by lamp 55, the sandwich of the film 1 and the film record 2 is moved to the developing and take-up side of the machine. The sandwich passes beneath an idler roller 60 mounted on the end of an extending arm 62 of a stationary roller bracket 64 which is mounted on a back plate 65. The roller 60 is located closely adjacent the drum 40 to maintain tension on the sandwich to provide a tight wrap around the drum. The sandwich passes beneath a second idler roller 66 which is mounted on a bracket 69 on the other side of the bracket 64. The film record is separated from the sandwich at the bottom of roller 66 and passes to a take-up spool 80. The take-up spool 80 is mounted at the bottom of a bracket pair 84 which is connected to the fixed base 7 or some other stationary member. The spool 80 is held in the bracket pair 84 by a shaft and bearing assembly 82. The spool is driven by a motor 86 mounted on one of the brackets 84 through a drive belt 88 and a pair of pulleys 88a and 88b mounted to the spool and motor, respectively.

The exposed film 1 to be developed passes beneath the idler roller 60 adjacent the drum and then around and over the idler roller 66 beneath a curved guide member 70. Another idler roller 68 is mounted to the back plate 65 and the guide member 70 is mounted at ends of the shaft 71 for roller 68. Roller 68 is preferably mounted, or biased, down against roller 66 so that the film 1 is engaged by both rollers to provide a point against which the film can be pulled to provide tension.

The film 1 then passes through the heat roll developer assembly 72. This assembly includes a drum 73, which is preferably of a highly polished, heat conductive material. Suitable electrical heater elements (not shown) are located within the drum. These elements are preferably thermostatically controlled and also adjustable to provide a constant desired developing temperature for the drum 73. The drum 73 is preferably rotated on a shaft by a motor (not shown) mounted on the rear of plate 65.

To adjust the tension of the film on the heater drum 73, a control knob 74 is mounted on the L-shaped frame arm 75 whose end is fastened to the back plate 65. As shown, the fastener 46 for the shroud 44 is mounted on top of the frame 75. The control knob 74 rotates a shaft 74a carrying a gear segment 76 between the frame 75 and the end of the heat drum. The teeth of gear segment 76 mesh with a rotatable pinion gear 77 mounted on the inner face of the frame 75. The pinion gear meshes with the teeth on the inner face of a sector gear 78 of about 150°–180°. The ends of the sector gear are connected to the diverging arms 79a and 79b of a bracket plate 79. A respective roller 81 and 83 is mounted on each arm 79a and 79b of the bracket plate and between the corresponding arms of a similar bracket plate (not shown) adjacent the rear mounting plate 65. The bracket plate 79 is mounted for rotation around shaft 74a but does not rotate therewith. The corresponding rear bracket plate (not shown) for the other end of each of roller 81 and 83 is also rotatably mounted on a suitable shaft, such as the shaft for heater drum 73, but it also does not normally rotate.

As shown in FIG. 1, the exposed film 1 passes over roller 71 and under the roller 83 of the tensioning assembly. The film then passes over and partially around the drum 73 and then beneath a roller 85 mounted on a holder 87 which in turn is mounted on back plate 65. To adjust the tension of the film around the heater drum, it is only necessary to rotate control knob 74 which rotates the bracket plate 79 (and the corresponding back bracket plate) and consequently the position of roller 83, through the gears 76, 77 and 78. For example, moving the roller 83 clockwise increases the tension and the surface contact of the film with the heater drum. The gear arrangement keeps the desired degree of tension. The roller 81 is an auxiliary roller over which the film can be passed, if desired. This reduces the contact area of the film over the heater drum 73 which may be desirable in some cases. As should be apparent, the exposed film is developed by the heater drum 73 as is consistent with the development of diazo type films. The degree of development is determined by the heater drum temperature and the degree of contact of the film thereover, both of which can be controlled.

The heat developed film is wound up on a take up spool 100 which is mounted by a suitable shaft and bearing assembly 102 on the upper end of the bracket pair 84. The take-up spool 100 is driven by a motor 106 mounted on one of the brackets 84 through a drive belt 108 and pulleys 108a and 108b mounted on the spool and the motor respectively. The speed of all four motors 16, 26, 86 and 106 are preferably made variable so that the speed and tension of the two webs 1 and 2 can be further controlled at various points. As explained previously, the drum 40 rotates only to overcome inertia and, therefore, the movement of the film and film record is primarily due to the take-up motors 80 and 100.

As should be apparent from the foregoing description, the film record 2 which is to be copied is copied on the film 1 which moves continuously about the rotating drum 44. The light energy is periodically pulsed as tripped by the photocell sensing mechanism 36, which insures that there is exposure of the film 1 at predetermined intervals. Thus, the film record 2 to be copied is essentially "stopped" by the periodically flashed light source 55 so that the record is exposed directly onto the film 1. There may be several exposures of any given frame of the film record 2 onto the film 1 as it travels around the drum 40 from between the idler roller 32 and the idler roller 60. The flashing of the energy source 55 is determined by the spacing of the frames on the photographic film record 2 when the automatic light energization system 36 is used. Of course, several flashes can be used per frame, that is, for example, sensing of a frame mark will trigger one flash and then another after the film has moved half a frame. The lamp 55 also can be energized every second, third, etc. frame by the provision of a suitable counter device at the output of the photocell sensor 36 or pulsed periodically at predetermined times. It is preferred that the system be automatically operated to energize the lamp 55. However, manual control can be utilized, if desired. In any event, the film is processed on a continuous basis.

While a preferred embodiment of the invention has been described above, it will be understood that this embodiment is illustrative only and the invention is to be limited solely by the appended claims.

What is claimed is:

1. Apparatus for exposing and developing at relatively high speed elongated web-type diazo type film to record information stored on an elongated web-type record carrier in segments which are defined by boundary markings comprising a transparent rotatable cylinder, means for feeding said film and said record carrier from separate locations to said cylinder to form a sandwich on said cylinder extending over an area of at least about 180° of the cylinder circumference to be moved with the cylinder as the cylinder is rotated, an elongated source of ultraviolet radiation within said cylinder, said lamp being of a length at least substantially equal to the width of said film rotating with said cylinder and mounted to transmit light to the entire portion of the sandwich of film and record carrier resting on said cylinder, means for rotating said cylinder without impeding the ultraviolet radiation transmitted from the source to the portion of the sandwich rotating with the cylinder, means for sensing the presence of at least one of said segments of information present on said record carrier which entire segment is located on said cylinder in a position to be exposed by ultraviolet radiation from said source, means responsive to said sensing means for operating said source to produce a pulse of ultraviolet radiation for a duration sufficient to substantially "stop" and to expose the entire segment of film rotating with said cylinder with the information on the record carrier, means for applying heat to said exposed film to develop said film, and means for guiding only said exposed film to said heat applying means after both said record carrier and said film leave the cylinder.

2. Apparatus as in claim 1 wherein said heat developing means comprises a heater drum and means for guiding the exposed film over the heater drum.

3. Apparatus as in claim 2 further comprising means for supplying a predetermined amount of tension to the film passing over the drum.

4. Apparatus as in claim 1 further comprising first means interposed between said radiation source and said film for reducing heat from said radiation produced by said source reaching said film while transmitting radiation in the ultraviolet range.

5. Apparatus as in claim 4 wherein said first means comprises a coating on the surface between the energy source and the film.

6. Apparatus as in claim 1 further comprising a light shroud means on the outside of said sandwich of film and record carrier.

7. Apparatus as in claim 1 wherein said film and said record carrier are webs which are in respective rolls located spaced from said cylinder, said feeding means including means for unwinding said webs from the respective rolls and bringing them into an adjacent relationship on said cylinder.

8. Apparatus as in claim 7 wherein said heat developing means comprises a heater drum and means for guiding the exposed film over the heater drum.

* * * * *